UNITED STATES PATENT OFFICE.

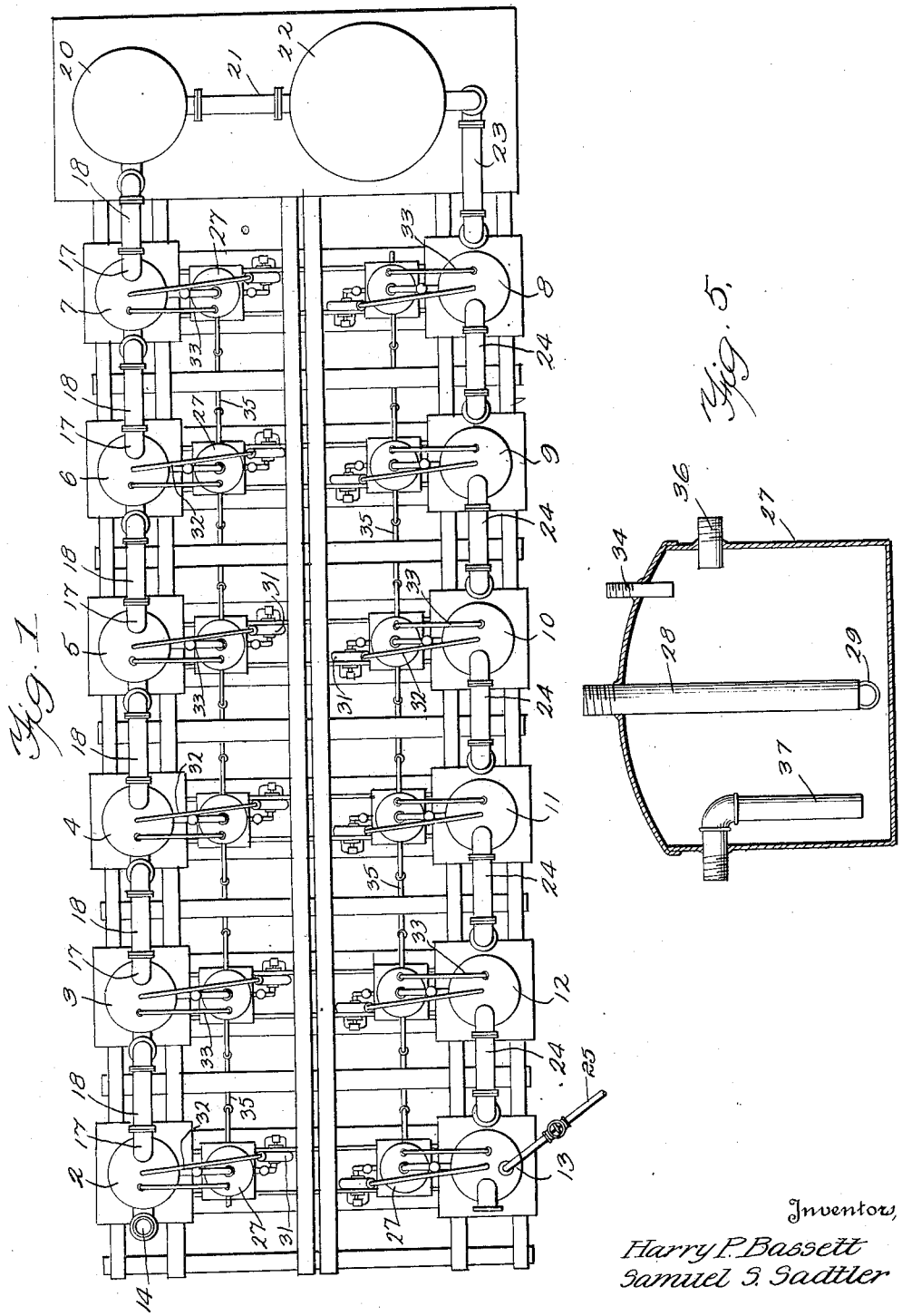

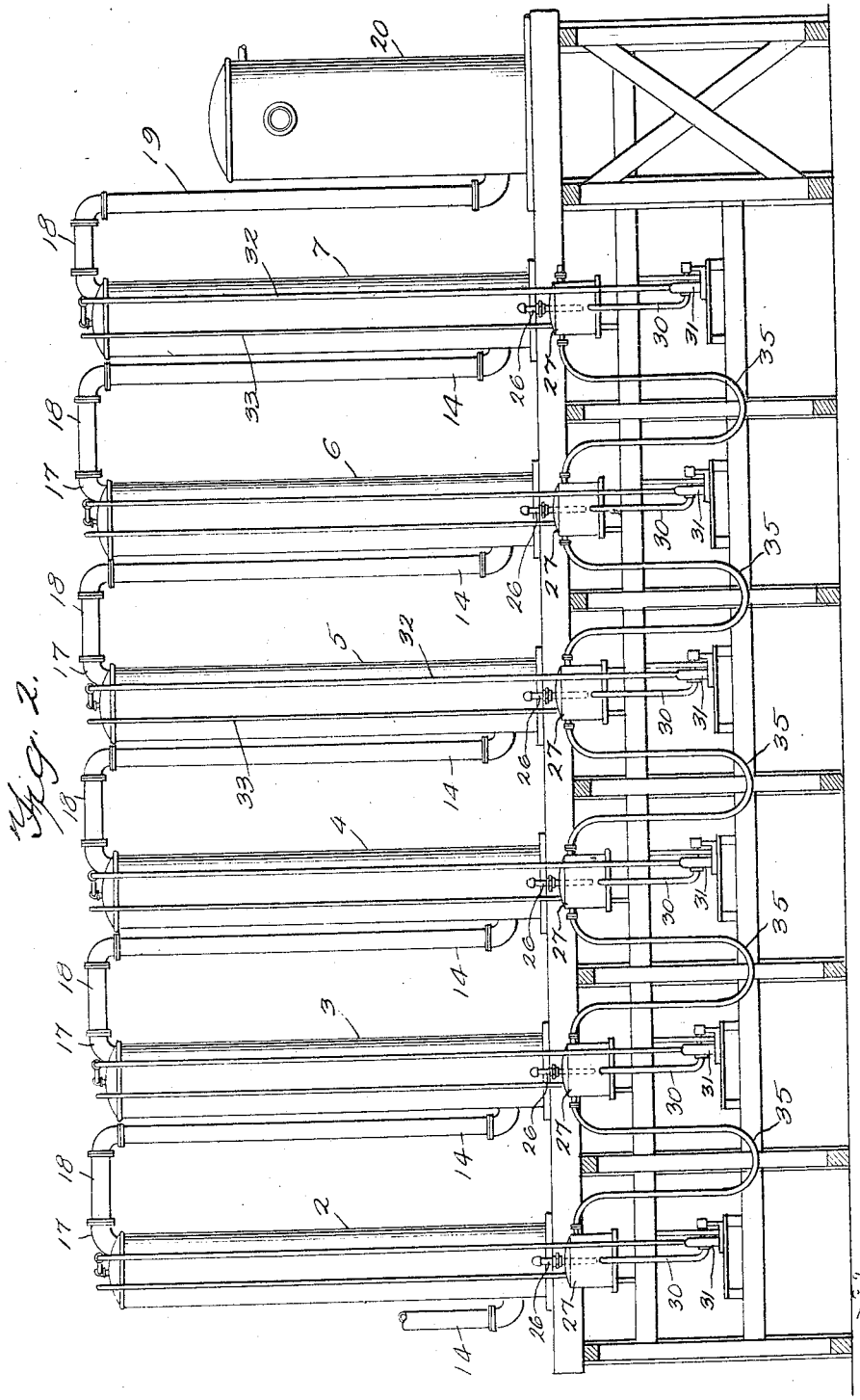

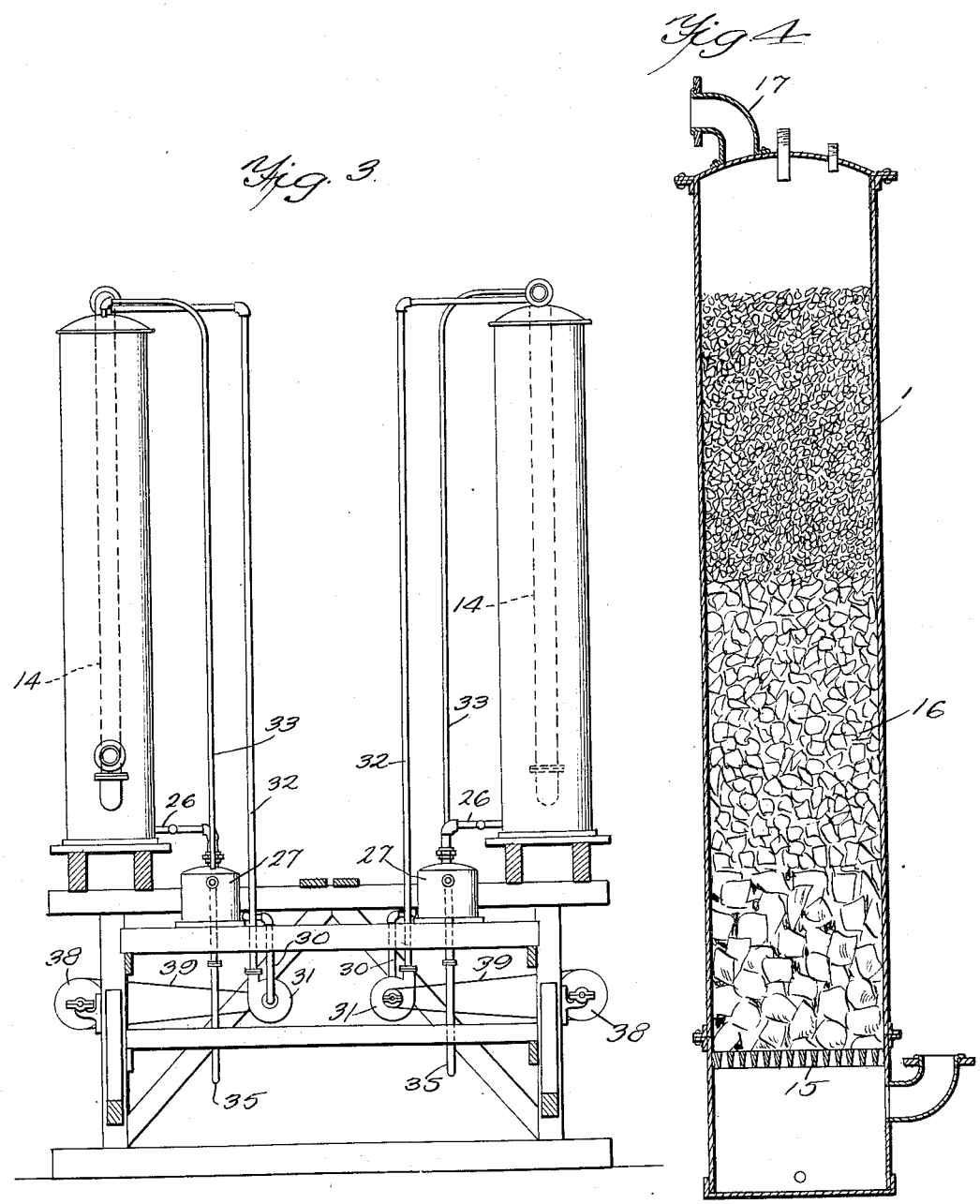

HARRY P. BASSETT, OF CYNTHIANA, KENTUCKY, AND SAMUEL S. SADTLER, OF SPRINGFIELD TOWNSHIP, MONTGOMERY COUNTY, PENNSYLVANIA.

PROCESS OF RECOVERING VOLATILE SOLVENTS.

1,395,940.   Specification of Letters Patent.   Patented Nov. 1, 1921.

Application filed September 17, 1920. Serial No. 410,943.

*To all whom it may concern:*

Be it known that we, HARRY P. BASSETT and SAMUEL S. SADTLER, citizens of the United States, residing at Cynthiana, in the county of Harrison and State of Kentucky, and Springfield township, in the county of Montgomery and State of Pennsylvania, respectively, have invented certain new and useful Improvements in Processes of Recovering Volatile Solvents, of which the following is a specification.

This invention relates to a process of recovering volatile solvents and particularly ether and alcohol from air or other gases, and to apparatus therefor, and comprises a process wherein air or other gases containing alcohol and ether is passed through a plurality of towers, in counter-current to an absorbing agent adapted to dissolve the ether, the absorbing agent being transferred from one tower to another, whereby the gas containing the least ether vapor is brought into contact with the absorbing agent freest of dissolved ether, and the gas containing the greatest amount of ether vapor is brought into contact with the most nearly saturated absorbing agent; the gases being then conveyed to a cooler and separator to remove excess moisture and finally subjected in a similar manner to the action of the absorbing agent resulting from the first treatment to remove the alcohol therefrom.

The invention further comprises apparatus particularly adapted for use in practising the process, comprising in its preferred embodiment two units, each consisting of a plurality of towers, means to deliver air or other gases from the top of each tower to the bottom of the adjacent tower, means to deliver the solvent absorbing agent to the last tower, means to collect the absorbing agent from each tower, and means to deliver the absorbing agent from the collecting means associated with each tower to the collecting means of the preceding tower, and to the tower.

The present invention provides efficient means for the recovery of ether and other solvents which are relatively or practically insoluble in or immiscible with water, such as ethyl ether, ethyl acetate, methyl acetate, amyl acetate, and the like, by the use of water having in solution therein, alcohol or other medium adapted to render the solvent to be recovered soluble or more soluble in water containing it.

Ethyl alcohol is known to be a solvent of ether vapor and it has been proposed to add a little alcohol to water and employ such very dilute alcohol to absorb ether vapor. We have, however, discovered that, contrary to the teachings and accepted belief in the art, a somewhat dilute alcohol containing approximately from 40 to 70 parts by volume of alcohol and from 30 to 60 parts by volume of water, is a more efficient solvent for ether than ordinary alcohol or the very dilute alcohol heretofore proposed for use as an ether vapor solvent and that diluted alcohol containing approximately 60 per cent. by volume of alcohol is a particularly efficient ether vapor solvent, practical tests showing that it is even more efficient than dilute alcohol containing 70 per cent. by volume of alcohol. Dilute alcohol of a strength particularly suitable for the absorption of ether vapor is produced in an advantageous manner in the process hereinafter described.

The process is particularly well adapted for use in recovering alcohol, ether, and other solvents used in the artificial silk, celluloid, smokeless powder and other nitro-cellulose industries. In such case, there is generally present a certain amount of alcohol vapor in the air treated as well as the vapors of ether or the like, and the process may be advantageously practised by first recovering the alcohol in our system of towers, using water as the absorbing agent until sufficient alcohol has gone into solution to give a solution of the proper strength for the recovery of the ether or the like, and then making use of this solution as the absorbing agent of the ether or the like. In the practice of our process, the absorption of alcohol is continued until a solution containing approximately from 40 to 70 per cent. and preferably approximately 60 per cent., by volume, is obtained and this solution is employed in dissolving the ether vapor.

According to the present invention, a system of towers divided into two units is employed, and the ether vapors are removed from the air in the first unit. Dilute alcohol containing approximately 60 per cent. by volume of alcohol is caused to flow through the towers in a counter-current, the alcohol solution entering the system at the last tower of the unit and being delivered progressively forward. Liquid collecting drums for each of the towers are provided and each of these drums is provided with connections for returning a portion of the absorbing agent to the tower with which it is associated and with another connection for delivering the excess absorbing agent to the next tower. As the absorbing agent passes through the tower, it becomes more and more saturated with ether, and is continuously delivered toward the outlet end of the system and the solution removed from the collecting drum associated with the last tower is saturated or nearly saturated with ether and contains a nearly predetermined amount of alcohol. This solution may be treated in any of the known or preferred methods, as by fractional distillation for separating the ether from the alcohol and water and alcohol from the water. The alcohol vapors are removed from the air in the second unit. Water is caused to flow through the tower in counter-current, the water entering the system at the last tower of the unit, and being delivered progressively forward. Liquid collecting drums for each of the towers are provided, and each of these drums is provided with a connection for returning a portion of the absorbing agent to the tower with which it is associated and with another connection for delivering the excess absorbing agent to the next tower. As the absorbing agent passes through the tower, it is becoming more and more saturated with alcohol so that a solution of alcohol of the strength indicated is obtained, or, if preferred, alcohol may be added to bring the liquid to the desired alcohol content. This solution is then delivered to the last tower of the first unit employed for extracting the ether or other like solvent.

In the accompanying drawings, we have shown apparatus particularly adapted for use in practising the process. In this showing:

Figure 1 is a plan view,
Fig. 2 is a side elevation,
Fig. 3 is a transverse sectional view through the apparatus taken between two of the towers,
Fig. 4 is a vertical sectional view of one of the towers, and,
Fig. 5 is a sectional view of one of the collecting drums.

Referring to the drawings, the reference numeral 1 designates the towers which are arranged as shown in two units. These towers are numbered from 2 to 13, respectively, the towers 2 to 7 forming the unit for the removal of ether and the towers 8 to 13 forming the unit for the extraction or removal of alcohol or other solvents.

Air containing alcohol and ether vapors is delivered to tower No. 2 by a delivery pipe 14. As shown in Fig. 4 of the drawings, each of the towers is provided with a grating or other perforated support 15, upon which is arranged quartz, or other suitable packing 16. As shown, the packing 16 is arranged in layers of relatively coarse and fine particles, the coarser layer being arranged at the bottom of the towers and the layers of finer particles being arranged at the top. Each of the towers is provided with an air outlet 17, connected by suitable connecting pipe 18 to the inlet 14 of the next adjacent tower. The connecting pipe 18 of the last tower 7 of the ether absorption unit is connected to the inlet pipe 19 of a cooler 20. The cooler 20 is of the usual construction, consisting of a tank having a number of tubes around which the gases flow and through which a suitable cooling medium, such as brine, is circulated. As the detail construction of the cooler forms no part of the invention, further description of the same is deemed unnecessary. From the cooler 20, the gases are conveyed through pipe 21 to a separator 22, where any excess moisture in the cooled air is removed. The separator is connected by pipe 23 with the inlet pipe of the first tower of the alcohol absorption unit. Each of the towers of the alcohol absorption unit are of the same construction as the towers of the ether absorption unit and are packed with a suitable material, such as quartz, to insure intimate contact between the gases and the absorbing agent. The gases enter each of the towers at the bottom and are removed at the top whence they are conveyed to the next tower by connecting pipe 24.

The absorbing agent is delivered first to the last tower 13 of the alcohol absorption unit by pipe 25, and enters this tower at the top, flowing through the tower in the opposite direction to the passage of air. The liquid is removed from the bottom of the tower through a valve controlled pipe 26, and conveyed to a collecting drum 27, one of such drums being provided for each of the towers. As the various connections between the drum and the tower are the same in each instance, a single set of such connections will be described. The pipe 26 is connected to a vertical pipe 28, arranged in the drum and extending to a point near the bottom. Outlet 29 is arranged in the drum near the bottom, and a pipe 30 is connected to this outlet, the pipe leading to a centrifugal pump 31, or other type of pump, by means of which the absorbing agent is delivered through pipe 32 at the top of the tower. It will be seen that, by the operation of the pump 31, the absorbing agent in the drum is continually returned to the tower to continually remove the alcohol from the air. As the system is operated under pressure, to insure delivery of the air through the towers, it is necessary to connect the drum and the tower independently of the connection by which the liquid is returned to the tower. A pressure equalizing pipe 33 is provided for this purpose, being connected to the top of the tower and to the drum, as at 34.

Each of the collecting drums is connected to the next drum by means of a U-tube 35, the U-tube being connected to a collecting drum from which the partly saturated solution is to be removed near the top of the drum, as at 36. This solution is delivered to the next drum at a point near the bottom through pipe 37.

The centrifugal pumps are driven from motors 38 by belts, or other suitable drive mechanism 39. Any of these pumps may thus be stopped, without interrupting the performance of the process, should occasion arise, the air passing through the corresponding tower and the absorbing agent being delivered to the next drum through the U-tube.

In practising the process, the air laden with vapors of alcohol and ether are delivered to the tower No. 2, thence through each of the towers of the ether absorption unit, the gases passing upwardly through the packing in counter-current to the absorbing agent which is brought into intimate contact with the gas to remove the ether. Weak alcohol is employed as the absorbing agent in the ether absorption unit and water is employed as the absorbing agent in the alcohol absorption unit. A greater or less number of towers may be employed in the alcohol absorption unit than are employed in the ether absorption unit, the number of towers employed being the number best suited for removing all of the alcohol vapor. While we have shown an equal number of towers in each unit in the drawings, it is generally unnecessary to use as many towers in the alcohol absorption unit as in the ether absorption unit.

The water which is employed as the absorbing agent in the alcohol absorption is delivered to tower No. 13 through a delivery pipe 25, passing through the tower, thence to the collecting drum by pipe 26. Additional water is continuously fed to the tower 13 during the operation of the process, the excess water flowing through the U-tubes 35 from the upper part of one collecting drum 27 to the lower part of the next collecting drum whence it is delivered by a pump 31 to the corresponding tower. The U-tube is connected to the collecting drums in the manner shown and described, so that the more saturated portion of the dilute alcohol solution in each of the drums which will be at the top, will be continuously removed and conveyed to the next drum, being delivered to the drum near the bottom and near the pump outlet 29. It will be apparent that, as the water passes through the system, the more saturated portions will be fed to the last collecting drum 27, connected to the tower 8. Relatively strong alcohol solution will be continuously removed from the last collecting drum 27 associated with tower 8, and this solution is employed as the absorbing agent for the ether recovery in the ether absorption unit, after, if desired, driving off a part of or preferably substantially all of the ether that will also be absorbed.

The air from tower 7 which is free or practically free of ether is delivered to the cooler 20, and thence to the separator 22. The function of the cooler is to slightly lower the temperature of the air to reduce its capacity for holding water vapor and thus render the removal of excess moisture in the separator 22 more efficient. From the separator, the air is delivered through pipe 23 to the tower 8, whence it flows through the towers of the alcohol absorption unit in the same manner as in the ether absorption unit, entering each tower at the bottom and being removed therefrom at the top.

The connections between the collecting drums and the towers are the same in both units, the alcohol solution from the collecting drum associated with tower 8 being delivered to the tower 7, when it flows to the corresponding drum 27 and is returned to the tower by the corresponding pump 31. The excess absorbing agent is continuously removed from each collecting drum and delivered to the collecting drum of the next tower. As in the alcohol absorption unit, the excess absorbing agent is, in each instance, removed from the top of the drum, whereby the more saturated portion of the absorbing agent is continuously delivered toward the outlet end of the system and the solution removed from the collecting drum associated with the tower 2 is saturated or nearly saturated with ether and contains a nearly predetermined amount of alcohol. This solution may be treated in any of the known or preferred methods, as by fractional distillation, for separating the ether from the alcohol and water and the alcohol from the water.

It will be noted that the least saturated absorbing agent in each unit of the system comes in contact with the weakest gas, that is, the gas containing the least of the alcohol or ether to be removed and that the most nearly saturated solution is brought into contact with the strongest gas, whereby the most efficient recovery may be obtained.

It will also be noted that our process contemplates the addition to an absorbing agent, such as water, in which vapors of a volatile solvent to be recoverd, such as ether, are relatively insoluble, of a solvent of the vapors of such volatile solvent, such as moderately diluted alcohol, whereby the resulting solution is made a solvent of such vapors, causing vapors of such volatile solvent to be absorbed in the resulting solution, and separating the volatile solvents from such solution.

While throughout the description of our invention, we have referred particularly to the recovery of ether, it is to be understood that the process is equally applicable to the recovery of ethyl, methyl, and amyl acetates, and other volatile solvents whose vapors are normally insoluble in water, but which are soluble in aqueous solutions of alcohol. Similarly, while we have referred to the recovery of alcohol, it is to be understood that the process is adapted for the recovery of the vapors of other liquids, such as acetone, solutions of which in water will absorb ether or other like volatile solvents which are substantially or partly insoluble in water.

While we have described our process and apparatus in detail, it is to be understood that the details of procedure and construction may be widely varied, without departure from the spirit of the invention or the scope of the subjoined claims.

We claim:

1. The herein described process of recovering a volatile solvent whose vapors are relatively insoluble in water and soluble in dilute alcohol, which comprises adding to water enough alcohol to make approximately from 40 to 70 per cent. by volume, causing vapors of such volatile solvent to be absorbed by the resulting liquid, and separating the volatile solvent from such liquid.

2. The herein described process of recovering a volatile solvent whose vapors are relatively insoluble in water and soluble in dilute alcohol, which comprises adding to water enough alcohol to make approximately 60 per cent. by volume, causing vapors of such volatile solvents to be absorbed by the resulting liquid, and separating the volatile solvent from such liquid.

3. The process of recovering ether and alcohol from ether and alcohol laden gases, which comprises subjecting the gases to contact with dilute alcohol containing approximately from 40 to 70 per cent., then subjecting the gases to the action of water to remove the alcohol, and separating the ether and alcohol from the absorbing agents.

4. The process of recovering ether and alcohol from ether and alcohol laden gases, which comprises subjecting the gases to contact with dilute alcohol containing approximately 60 per cent. to remove ether, then subjecting the gases to the action of the water to remove the alcohol, and separating the ether and alcohol from the absorbing agents.

5. The process of recovering ether and alcohol from gases, which comprises passing the gases through a plurality of towers in counter-current to dilute alcohol to remove the ether, the dilute alcohol being delivered progressively forward from the last tower whereby ether is absorbed, then passing said gases through a plurality of towers in counter-current to water to remove the alcohol, and separating the ether and alcohol from the absorbing agents.

6. The process of recovering ether and alcohol from gases, which comprises subjecting the gases to contact with dilute alcohol to remove the ether, then removing moisture from said gases and subjecting them to contact with water to remove the alcohol, and separating the ether and alcohol from the absorbing agent.

In testimony whereof we affix our signatures in presence of two witnesses.

HARRY P. BASSETT.
SAMUEL S. SADTLER.

Witnesses:
MARY F. LYONS,
Miss F. BARBER.